United States Patent [19]

Matschulat et al.

[11] Patent Number: 5,271,345
[45] Date of Patent: Dec. 21, 1993

[54] DEVICE FOR OPTICALLY SCANNING THE MATERIAL BEING SEWN IN A SEWING MACHINE

[75] Inventors: Bernd Matschulat, Aldingen; Robert Massen, Radolfzell; Bernhard Mertel, Enkenbach-Alsenborn, all of Fed. Rep. of Germany

[73] Assignee: G.M. Pfaff Aktiengesellschaft, Kaiserslautern, Fed. Rep. of Germany

[21] Appl. No.: 822,547

[22] Filed: Jan. 17, 1992

[30] Foreign Application Priority Data

Jan. 18, 1991 [DE] Fed. Rep. of Germany ....... 4101346

[51] Int. Cl.⁵ .................. D05B 21/00; D05B 35/10; D05B 35/12
[52] U.S. Cl. .................. 112/121.12; 112/306; 250/561
[58] Field of Search ......... 112/121.12, 121.11, 112/306, 308, 2; 250/559, 561, 571; 271/227, 265

[56] References Cited

U.S. PATENT DOCUMENTS

| | | | |
|---|---|---|---|
| 3,385,245 | 5/1968 | Ramsey | 112/2 |
| 4,498,404 | 2/1985 | Sadeh | 112/121.12 |
| 4,681,048 | 7/1987 | Willenbacher | 112/262.3 |
| 4,932,343 | 6/1990 | Mardix et al. | 112/308 X |

FOREIGN PATENT DOCUMENTS

| | | |
|---|---|---|
| 0067696 | 9/1985 | European Pat. Off. |
| 0309069 | 3/1989 | European Pat. Off. |
| 2145635 | 10/1973 | Fed. Rep. of Germany |
| 3735032 | 4/1989 | Fed. Rep. of Germany |
| 4000988C1 | 5/1991 | Fed. Rep. of Germany |
| 2237412 | 5/1991 | United Kingdom ............ 112/306 |

Primary Examiner—Peter Nerbun
Attorney, Agent, or Firm—McGlew and Tuttle

[57] ABSTRACT

To scan the material being sewn (30, 31) in a sewing machine in an annular area around the presser foot, an annular lens system (25) is provided, which images a circle (33) concentrically surrounding the presser foot in the plane (A) of the material being sewn onto the light inlet ends of a likewise annularly arranged plurality of optical fibers (26). The optical fibers (26) lead, in an individual assignment, to the individual light-receiving elements of a photoelectric sensor line of a line camera, which sensor line can be read cyclically.

20 Claims, 3 Drawing Sheets

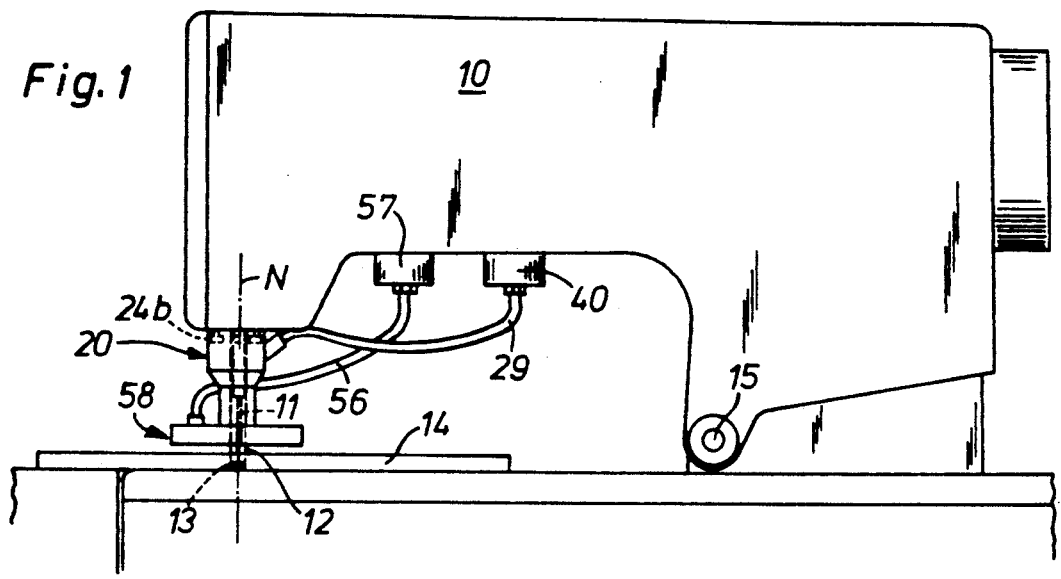
Fig.1
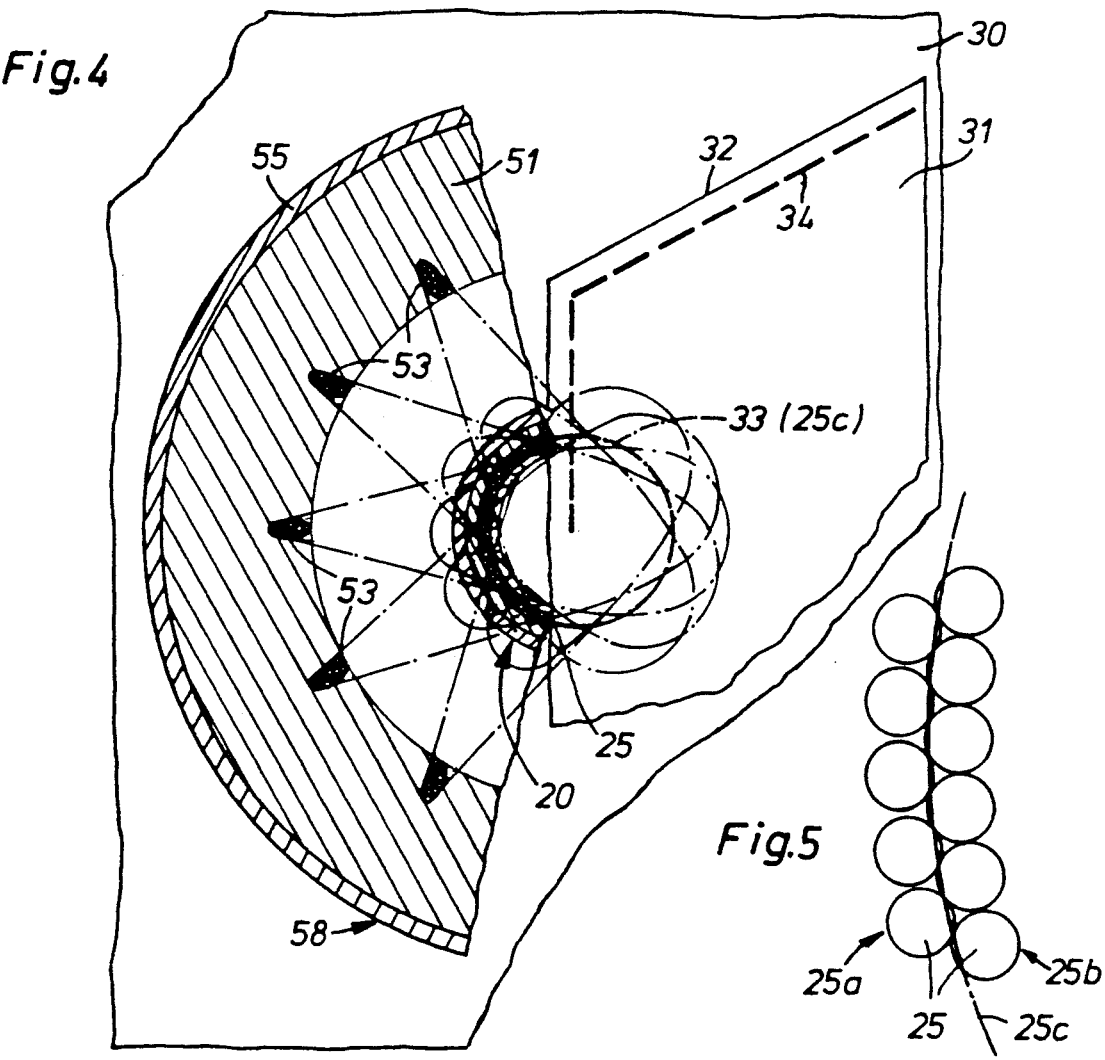
Fig.4
Fig.5

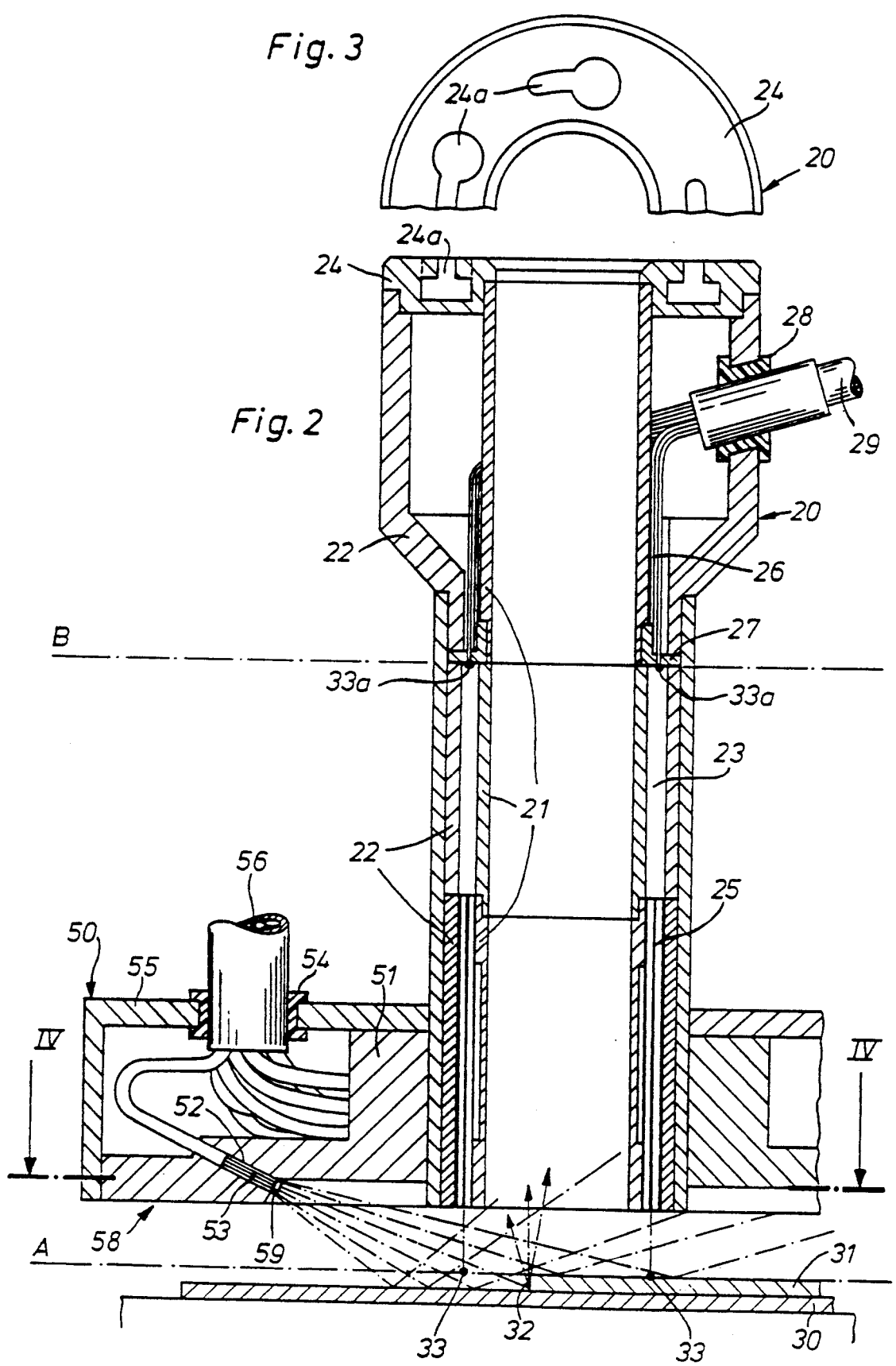

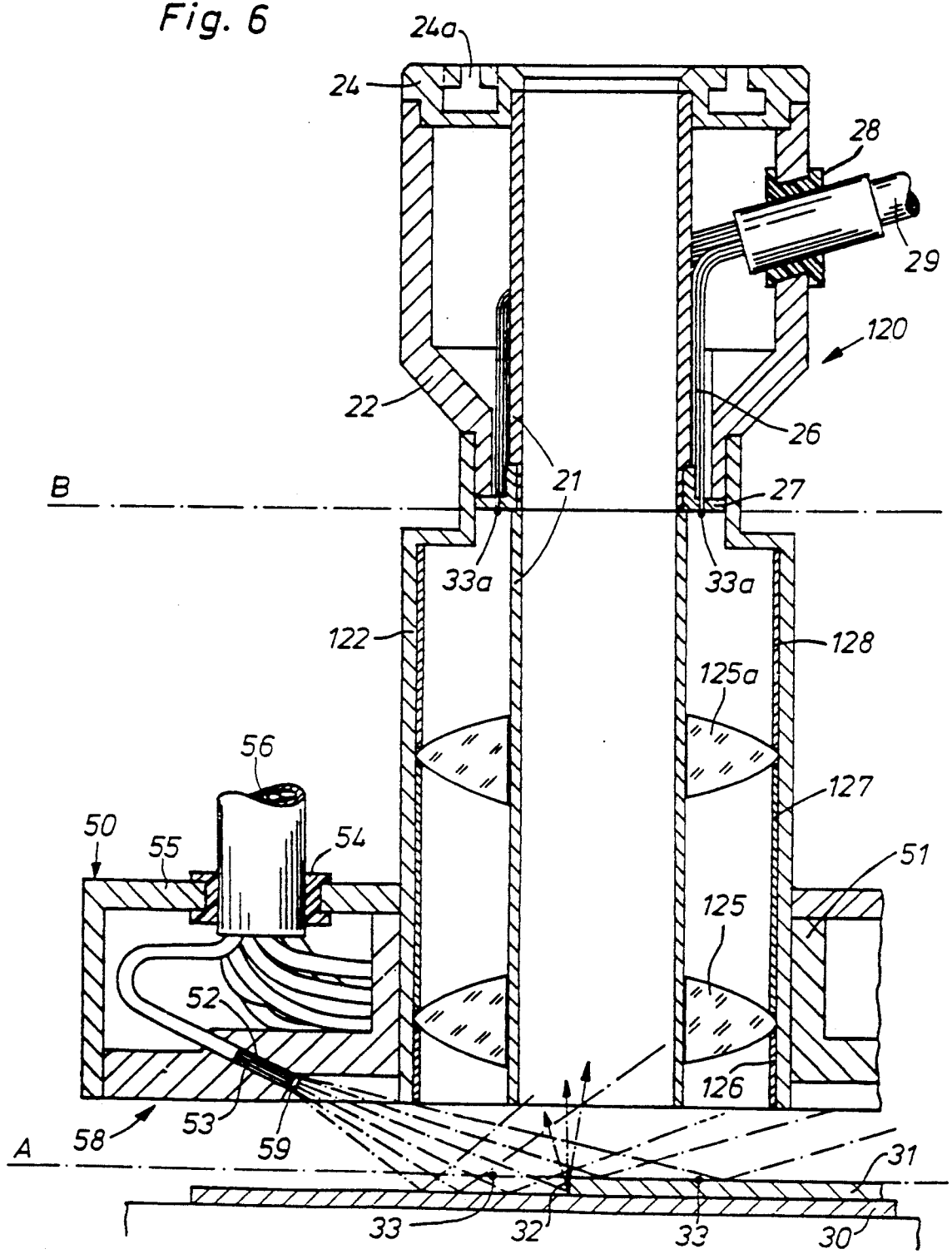

1

DEVICE FOR OPTICALLY SCANNING THE MATERIAL BEING SEWN IN A SEWING MACHINE

FIELD OF THE INVENTION

The present invention pertains to a sensor device for a sewing machine for scanning a circular scanning zone surrounding the presser foot and more particularly to an optical imaging system whose objective is directed toward a plane of the material being sewn from the top, in order to image a linear area of this plane onto a cyclically readable sensor line, to locate a site of an edge of the material being sewn.

BACKGROUND OF THE INVENTION

A device of this type has been known from European Preliminary Patent Disclosure Document No. EP-OS 0,309,069. It is often desirable in sewing technology to have the seam to be prepared automatically following the course of the edge of the cut of material being sewn, doing so at the most uniform lateral distance possible. This "edge-parallel" sewing requires a control system which adjusts the direction of the relative movement between the material being sewn and the sewing needle correspondingly on the basis of the information available on the course of the edge, either by properly dimensioning two mutually perpendicular feed vectors (e.g., in a sewing machine with an XY displacement table) or by turning the material being sewn around the needle axis (in the case of sewing machines with one-dimensional feed).

In the mass production of sewn products with edge-parallel seams, it is advantageous to enter the desired course of the seam into a memory in advance as a data set in order to subsequently control the movements of the material being sewn during sewing according to a program determined by these data. For example, the material being sewn can thus be moved past the stationary presser food along a path corresponding to the seam course stored by means of an XY displacement table. However, the edge of the material cut may deviate from the stored shape during the sewing process as a consequence of various influences. These influences are, e.g., drawing of the material being sewn during sewing, keeping together incorrectly the pieces to be sewn together, or distortion of the edge of the material cut due to clamping on the XY table. The results thus obtained are not satisfactory, because constant distance between the seam and the edge is an important requirement. Even a deviation by as little as a few tenths of one millimeter leads to an aesthetically unattractive appearance. To eliminate these defects, a control system is required which takes into account the actual position of the edge during the control of the movement of the material being sewn. If the scanning range is large enough and the response time is short, such a control system alone would be able, if desired, to control the course of the seam, without being supported by data stored in advance.

A control system for guiding the seam at a constant distance from the edge of the material being sewn requires a sensor device which monitors the material being sewn in the area of the sewing needle and supplies information on the relative position of the edge in relation to the needle. Various embodiments of such devices have been known. For example, U.S. Pat. No. 4,498,404 discloses a photoelectric sensor line, on which a straight, linear area of the surface of the material being sewn, which is located in front of the sewing needle and extends at right angles to the preferred direction of sewing, is imaged by means of a mirror and lens system. On reading the photoelectric cells of the sensor line, a shadow-casting edge of the material being sewn in the imaged area becomes noticeable as a characteristic change int he signal, so that an evaluation device will be able to determine the actual three-dimensional position of the edge point imaged in order to adjust the movement of the material being sewn so that the seam formed with remain at the specified distance from the edge of the material being sewn.

Since the area being scanned with this prior-art sensor device is limited to a stationary straight line on one side of the sewing needle, the edge guiding is able to function only as long as the material being sewn is moving from this direction toward the sewing needle, i.e., the material being sewn must always be turned into the corresponding direction in the case of curved or angularly projecting or offset edges, which requires an expensive pivoting mechanism, as is provided in the sewing machine according to the above-mentioned U.S. Pat. No. 4,498,404. The prior-art sensor device is unsuitable for other sewing machines, which do not have such a mechanism, and operate with a two-dimensional XY displacement of the material being sewn instead.

In view of this problem, it has been suggested that the sensor device with its sensor line, the optical system and the corresponding illumination, be arranged movably, rather than being permanently installed, so that it will be able to move around along a circular path around the sewing needle, as is described in EP-OS 0,309,069. This system creates a circular scanning zone that concentrically surrounds the presser foot. The area imaged on the sensor line is always a straight line section which also represents a chord in the circular scanning zone and can be followed by moving the device around the sewing foot, so that an edge of a material being sewn can always be monitored in a forward-looking manner, regardless of the direction from which the material being sewn is moving toward the sewing needle. It is a disadvantage of this device that an expensive and bulky mechanism with drive motor and gear parts, whose inertia also prolongs the response time of the entire control system, is required for the necessary circular movement.

A device which operates without moving mechanical parts to scan the material being sewn around the sewing needle in a redetermined direction from it for edge-parallel sewing has been known from U.S. Pat. No. 3,385,245. This device has four photocells arranged in the presser foot, which are arranged all around the needle passage hole of the presser foot at uniform distance from it. Since the photocells are located immediately above the workpiece, edge scanning is possible only with transmitted light, so that the use of this device is limited to translucent materials. Processing of materials that are not transparent to light, e.g., leather, is not possible with the prior-art device, because edges on such materials can be recognized in incident light only.

For detecting edges with incident light, it is in many cases absolutely necessary to arrange the light-receiving elements of the sensor device at a certain distance from the surface of the material being sewn in order for space to be left for oblique illumination of the edge, because oblique illumination is necessary in most cases to make edges more clearly visible, especially if the piece of material being sewn that forms the edge has the same surface brightness as the substrate. To image the points to be scanned on the surface of the material being sewn from the said distance on the light-receiving elements of the sensor device, an optical system must be present in the space between the plane of the material being sewn and the light-receiving elements.

SUMMARY AND OBJECTS OF THE INVENTION

It is an object of the present invention to provide a device for a sewing machine for scanning an annular scanned zone of the plane of the material being sewn, which zone surrounds the presser foot, by means of an optical imaging system whose objective is directed toward a plane of the material being sewn from the top, in order to image a linear area of this plane onto a cyclically readable sensor line for locating a site of an edge of the material being sewn with an optical scanning system which permits an annular zone of the plane of the material being sewn surrounding the presser foot to be completely optically scanned without using moving mechanical parts.

According to the invention, a sensor device for a sewing machine is provided for scanning an annular scanned zone of a plane of the material being sewn, which zone surrounds the presser foot, by means of an optical imaging system. The optical imaging system has an objective directed toward a plane of the material being sewn from the top, in order to image a linear area of the plane onto a cyclically readable sensor line for locating a site of an edge of the material being sewn. The invention provides that the objective of the imaging system circularly surrounds the vertical axis of the needle and is arranged in order to generate a virtual image of the entire annular scanned zone of the plane of the material being sewn in an imaging plane. A plurality of image transmitting optical fibers are provided whose light inlet ends occupy the points of the virtual image which represent the image of a concentric circle within the scanned zone of the plane of the material being sewn and which have outlet ends which are optically coupled in an individual assignment with the elements of the sensor line that are to be read consecutively.

Unlike in the imaging system according to the above-mentioned EP-OS 0,309,069, the entire circular line rather than only a linear partial area of the annular zone is imaged on a sensor line with the device according to the present invention, without the need to move any parts of the scanning device around the sewing foot to achieve this. The stationary annular objective generated an image of the entire annular zone in one image plane, and only those points of this image which represent a concentric circle within the annular zone of the plane of the material being sewn (object plane) are transmitted to the elements of the image sensor by means of optical fibers.

The use of lens system to image a circular scanning zone on the inlet end of a circular light guide bundle for scanning patterns has been known in itself from German Auslegeschrift No. DE-AS 21,45,635. In this state of the art, an objective consisting of a single convergent lens is used to image the annular area, which intersects a line to be scanned on the original, onto the annularly arranged ends of the light bundle, However, this objective does not permit a material being sewn to be scanned during the sewing process because the stitch-forming device would be in the way of the imaging system in this case. This might also be the reason why only optical systems whose field of view covers only part of the annular area, and which must therefore be circulated by an expensive mechanism, as is shown by the EP-OS 0,309,069 discussed above, have been used so far to scan an annular area that is to surround a sewing needle. In contrast, the objective in the device according to the present invention has an annular three-dimensional shape and is "open" in the middle, so that the sewing tools are able to extend through it from the top.

By using gradient lenses, as provided in an advantageous embodiment of the present invention, the imaging system can be designed as a highly compact system. A "gradient lens" is a rod-shaped light guide section whose refractive index changes from the inside to the outside so that light beams entering at the front end are forced to follow a wave-shaped or helical path, while light beams that impinge in parallel are periodically focused and defocused. Selected lens effects can be achieved by appropriately dimensioning the length of the light guide section. It is even possible to create, with a single gradient lens, an imaging system that would require a plurality of lens bodies arranged one behind the other if conventional lenses were used, in order to obtain, e.g., an upright image (i.e., an image that is not "upside down"). The image can be transmitted with high resolution, because the number of individual image-transmitting optical fibers can be substantially greater than the number of gradient lenses. Consequently, it is not necessary to provide a separate gradient lens for each point to be imaged.

The use of gradient lenses, which are also often called "Selfoc" lenses (trademark of Nippon Sheet Glass Company Ltd.), for imaging purposes has been known in itself. For example, European Patent No. EP-PS 0,067,696 discloses an arrangement consisting of a plurality of adjacent Selfoc lenses to provide an imaging system. It has been known from German Offenlegungsschrift No. DE-OS 37,35,032 that a gradient lens acting as an objective can be arranged at the end of a normal light guide. However, this state of the art does not suggest the provision of an annular array of gradient lenses in conjunction with a fairly large number of image-transmitting optical fibers to create an annular sensor surrounding the sewing tool in a sewing machine.

In the device according to the present invention, the gradient lenses are preferably dimensioned so that each of them images the area of the scanned zone that it sees as an upright image. As a result, it is achieved that the curvature of the individual circle segments will; not be "turned over" during the imaging process, so that the image of a circle of the object plane is also a "smooth" circle, which simplifies the placement of the optical fibers. The gradient lenses are preferably arranged so that their optical axes extend in parallel to one another, i.e., they form a cylindrical ring that is at right angles to the plane of the material being sewn. The ring of the gradient fibers may be a single-row or double-row ring. In the case of single-row array, the optical fibers should occupy the circle in the imaging plane which passes through the optical axes of the gradient lenses. Thus, the circle imaged in the plane of the material being sewn is the one which is defined by the points of intersection of the optical axes with the plane of the material being sewn. In the case of a two-row arrangement, the gradient lenses are to be dimensioned so that an upright image will always be produced on an imaging scale of 1:1. The ends of the image-transmitting optical fibers should now occupy the points of the imaging plane. This imaging plane lies on a circle in the middle between the optical axes of the rows of two gradient lenses, because this is precisely where the points imaged by the two lens rows will meet on the same circle in the plane of the material being sewn.

Instead of a plurality of gradient lenses arranged in an annular pattern, it is also possible to use, in another embodiment of the present invention, a lens system which has one or several spherical lenses that are arranged one behind the other and have a central bore in them.

To illuminate the edge of the material being sewn moving through the annular scanned zone preferably from the side, so that the edge will produce as strong a scattered light as possible, so that it will appear bright against the other areas, an annular illuminating device, which surrounds the presser foot, is advantageously used.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a side view of a sewing machine with a sensor device according to the present invention;

FIG. 2 is an axial sectional view of a first embodiment of the sensor device and the material being sewn located under it;

FIG. 3 is a partial top view of the sensor device;

FIG. 4 is a cross section of part of the sensor device represented in FIG. 2 along the line IV—IV in FIG. 2, together with a top view of the subjacent material being sewn;

FIG. 5 is a detail of two rings of gradient lenses touching each other and the position of a concentric circle intersecting them uniformly on a larger scale; and FIG. 6 is an axial sectional view of a second embodiment of the sensor device.

DETAILED DESCRIPTION OF THE PREFERRED EMBODIMENT

Referring to the drawings in particular, the sewing machine shown in FIG. 1 includes a machine arm which is generally designated 10 which includes a head carrying an annular sensor device 20, hereinafter called "annular sensor" 20. The annular sensor 20 concentrically surrounds the needle 11 and the presser foot bar 12 of the presser foot (holding-down device) 13. The presser foot 13 presses a material being sewn (not shown in FIG. 1), which is held by a holder 14 (for holding the material being sewn) which can be moved two dimensionally by means of a mechanism (likewise not shown), e.g., in two mutually perpendicular directions (XY displacement). This two dimensional movement allows the seam formed by means of the sewing needle 11 to follow any desired path over the material being sewn. In the case of so-called "edge-parallel sewing," it is necessary to move the material being sewn so that the seam formed will always remain at a predetermined distance from an edge of the material being sewn. The annular sensor 20 can now also perform the task of pre-scanning the exact course of the edge of the material being sewn in relation to the sewing needle 11.

A lower piece of leather 30 and an upper piece of leather 31 lying over it are shown as an example of the material to be sewn in FIG. 4. The upper piece 31 has a curved edge 32 and is to be sewn to the lower piece 30 by means of a seam 34, which extends at constant distance from and in parallel to the edge 32. To scan the course of the edge 32, the material to be sewn shall be scanned optically along a circle 33 which concentrically surrounds the touchdown point of the sewing needle 11. The annular sensor 20 is used for this purpose.

As is apparent from FIGS. 2 and 4, the annular sensor 20 forms a double-walled tube which has an inner tube 21 and an outer tube 22 which define between them a generally cylindrical annular cavity 23. As is shown in FIG. 2, the two tubes 21 and 22 may each be composed of a plurality of pieces. An annular flange 24, which has recesses 24a for receiving the claws 24b (FIG. 1) of a bayonet connection, is arranged at the top end of the tube. The tube forms the center of an interior space that is wide enough so that the tube can be pushed from below over the presser foot 13 in order to be fastened on the head of the machine arm 10 by means of the bayonet connection.

An annular array of gradient lenses 25, each consisting of a rod-shaped light guide section with the refractive index changing from the inside to the outside, as was described above, wherein the annular array annularly surrounds the vertical axis N of the needle 11, is located in the lower section of the annular space 23 between the inner tube 21 and the outer tube 22. The gradient lenses 25 form two concentric rings 25a and 25b that touch each other, wherein the angular positions of the lenses of the outer ring 25a are located between the angular positions of the lenses of the inner ring 25b. The concentric annular zones formed by the two lens rings thus overlap, so that a circle 25c, which is covered by the two lens rings 25a, 25b, exists in the cross section plane. The circle 25c is congruent with the above-mentioned circle 33.

The gradient lenses 25 are dimensioned so that when the annular sensor 20 is placed on the head of the machine arm 10, each lens 25 will image one area of the plane A of the material being sewn into a common image plane B as an upright image on a scale 1:1. Thus, the points of the circle 33, which extends exactly in the middle between the two lens rings 25a and 25b in the vertical projection in the object plane A, are imaged by each the lens ring 25a, 25b to the same circle 33a of the image plane B, wherein this circle is also located in the middle between the two lens rings 25a and 25b in the vertical projection. The light inlet ends of a plurality of optical fibers 26 are located at the site of this the circle 33 i a, next to each other in a circle. The ends of the fibers 26 are held in closely spaced bores which are located in a ring flange 27 between the inner tube 21 and the outer tube 22. As an alternative, the ring flange 27 may also be replaced with two rings, one of which is fastened to the inner tube 21, and the other of which is fastened to the outer tube 22, and which define between them a narrow annular gap at the site of the circle 33a of the image plane B, in which gap the ends of the optical fibers 26 can be held immediately next to one another. The optical fibers 26 are brought together at the site of a passage opening 28 that is located in the wall of an expanded upper section of the outer tube 22, and are led from there as a cable 29 to a line camera 40 that is fastened to the machine arm 10, as is schematically shown in FIG. 1.

The line camera 40 contains a linear array of individual photosensitive elements, e.g., a CCD row (charge couple device row), which can be read cyclically in the known manner in order to obtain as the output signal a sequence of electrical impulses which are representative of the light received by the individual light-sensing elements of the line camera. In this case, each of these light-sensing elements is optically coupled with the light outlet end of a respective associated specimen of the optical fiber 26, e.g., by a so-called fiber window, without the intermediary of a lens system, so that the consecutive output signals of the line camera 40 represent an image signal which reproduces the brightness distribution of the circle 33 imaged by the gradient lenses 25 as a function of the angular position. Reading is organized so that consecutive impulses of each reading cycle reproduce the brightness values of the circle imaged in a sequence that corresponds to progressing angular positions. This can be achieved by arranging the optical fibers 26 so that their order on the photosensitive elements of the line camera exactly corresponds to their order along the circle 33 imaged in the annular sensor 20. However, the optical fibers 26 may also be coupled with the light-sensing elements of the line camera in an "unordered manner," and the correct sequence of the impulses in the image signal can be brought about by electronic rearrangement during or after reading.

In the course of each reading cycle, the above-described ordered scanning of the optical fibers 26 by means of the line camera 40 generates an image signal which represents the brightness, as seen by the aperture of the gradient lenses 25, of the consecutive points along the circle 33 of the plane of the material being sewn. If this scanning reaches an optically recognizable edge of the material being sewn, the image signal will change abruptly. The angular position of the site where the edge of the material being sewn crosses the circle 33 can be inferred from the point in time at which this abrupt change within the given scanning cycle occurs. The coordinates of this point can be calculated from this and from the known radius of the circle 33. By comparing these coordinates with desired coordinates, which are preset for edge-parallel sewing, it is possible to derive a control signal which influences the movement of the material being sewn so that the seam 34 will always remain at a constant distance from the edge 32 of the material being sewn.

In order for the edge 32 of the material being sewn to be able to be clearly distinguished for the optical system of the annular sensor 20, the plane of the material being sewn in the scanning area of the annular sensor 20 is illuminated at such a large incidence angle (e.g., 70–°80° relative to the vertical) that the light reflected by the surface of the material being sewn according to the reflection law will not fall in the effective aperture of the imaging system of the annular sensor 20 formed with the gradient lenses 25. This is illustrated by the path of rays shown by dash-dotted lines in FIG. 2. Therefore, the imaging system can receive only scattered light from the surface of the material being sewn. Since the incident light is scattered particularly intensely at an edge of the material being sewn (at any rate more intensely than in other surface areas, as is symbolically indicated by the arrows in FIG. 2), the edge 32 of the material being sewn will appear brighter in the imaging plane B than do the other parts of the material being sewn, so that a particularly pronounced and readily detectable change in signal is obtained during the scanning of the edge. It was found that even edges on very smooth and very bright pieces of material being sewn, e.g., on white leather parts with glossy surfaces, can thus be detected.

The illuminating device may be, e.g., an annular tubular lamp which concentrically surrounds the lower area of the annular sensor. However, an illuminating device 58 with annular array of individual light sources, as is shown in FIGS. 2 and 4, is preferably used. In the case shown, an annular holder 50 is fastened with a ring flange 51 at the lower end of the annular sensor 20, wherein the holder 50 is provided with a plurality of bores 52 distributed over the circumference, wherein the axes of the bores are directed toward points distributed circumferentially on the circle 33 in the plane A of the material being sewn. The ends of individual light guide bundles 53 are seated in the bores 52. The individual light guide bundles 53 are integrated into a cable 56 at a passage opening 54 provided in the cover plate 55 on the rear side of the ring flange 51, and the cable leads to a common illuminating light source 57 that is fastened to the machine arm 10. The individual light guide bundles 53 illuminate adjacent and overlapping areas of the circle 33, as is indicated by the dash-dotted lines in FIG. 4. The angle of irradiation and consequently the width of overlap of the radiation cones of the light guide bundles 53 are further increased by Fresnel lenses 59 arranged at their illuminating end. This overlap is preferably so great that each radiation cone overlaps at least half of the respective adjacent radiation cone at the site of the circle 33. This measure makes it possible to illuminate the edge 32 of the material being sewn from the side even if it extends exactly radially to the circle 33. This increases the desired scattered light effect of the edge 32.

The above-described arrangement leads to the formation of a sensitive annular sensor 20 which is able to optically scan a circle 33 concentrically surrounding the touchdown point of the sewing needle 11 on the surface of the material being sewn for edge detection at high resolution. The larger the number of the optical fibers 26 used along the imaged circle 33a, the higher is the resolution. However, the number of the gradient lenses 25 may be much smaller. In one practical embodiment, 128 gradient lenses were arranged in two annular rows, with 64 such lenses per row, in a circle with a diameter of 18 mm. Two hundred and fifty-six optical fibers 26 were provided in the imaging plane B. This leads to an optical resolution of about 0.2 mm for a scanning circle with a diameter of 18 mm.

Other embodiments or variants are, of course, also possible, besides the above-described embodiments. Thus, as was mentioned above, it is also possible to use a single-row ring instead of a two-row annular array, and to dimension the lenses so that the imaging plane will fall on the end faces of the lenses, so that the lenses can directly touch the image-transmitting optical fibers, which simplifies the mechanical construction. To keep the light reflected from the surface of the material being sewn away from the effective aperture of the lens system, it is also possible to provide for additional blocking, e.g., by extending the lower ends of the inner tube 21 and of the outer tube 22 of the annular sensor 20 somewhat beyond the lower ends of the gradient lenses 25.

As was mentioned above, the annular imaging system can also be realized with one or several spherical lenses arranged one behind the other, which have a hole in their centers, along their optical axes, in order to permit the presser foot 13 to pass through. Such an embodiment of the sensor device is shown in FIG. 6, where the components which correspond to the individual components of the arrangement according to FIG. 2 are designated by the same reference numerals.

Instead of the annular arrangement of gradient lenses, the annular sensor 120 according to FIG. 6 contains a single "central" lens system consisting of two spherical lenses 125, 125a arranged one behind the other, which are maintained at a spaced location from one another by spacer rings 126, 127, 128 within an outer tube 122. The outer tube 122 has a larger diameter than the outer tube 22 according to FIG. 2. The lenses 125, 125a are dimensioned and arranged such that they image the circle 33 of the plane A of the material being sewn onto the circle 33a of the image plane B, preferably as an upright image on a scale of 1:1. The imaging properties of a spherical lens do not change when a hole is drilled in the optical axis. In a spherical lens, all points of the surface contribute to the imaging, but the distortions increase far away from the optical axis. However, if such errors are not acceptable, the lenses can be designed by the person skilled in the art so that these distortions will be compensated by a lens curvature differing from the spherical shape or by arranging a plurality of lenses of different focal distances one behind the other. The annular sensor 120 will act in this case just as does the annular sensor 20 according to FIG. 2, which operates with the gradient lenses 25, and it may have the advantage that the effective aperture or the light-receiving surface as a whole will be substantially larger, and consequently also the sensitivity of the system will be substantially higher compared with the rather small opening peculiar to all gradient lenses. The overall height can also be reduced, especially if producing an upright image is abandoned and the circle 33 of the plane of the material being sewn is imaged "upside down," as a result of which the lens system will be shorter. Upside-Down imaging is not critical when a "central" lens system is used, unlike in the case of multicellular imaging by means of a plurality of parallel lenses according to FIG. 2, and it requires only a 180° phase shift of the reading cycles.

To remove the annular sensor 20 or 120 with the illuminating device 58 from the head of the machine arm 10, e.g., to change the needle or for rethreading, the machine arm 10 is preferably mounted pivotably around a hinge 15, so that it can be folded up.

While specific embodiments of the invention have been shown and described in detail to illustrate the application of the principles of the invention, it will be understood that the invention may be embodied otherwise without departing from such principles.

What is claimed is:

1. A sensor device and sewing machine for scanning an annular scanned zone of a plane a material being sewn, said scanned zone surrounding the presser foot, the sensor device comprising:
   optical imaging means having an objective directed toward a plane of the material being sewn from above, in order to image a linear area of said plane onto a cyclically readable sensor line for location of a site of an edge of material being sewn, said optical imaging means including an objective circularly surrounding a vertical axis of a needle of the sewing machine, said optical imaging means having means to generate a virtual image of the entire annular scanned zone of the plane of the material being sewn in an imaging plane and including a plurality of image-transmitting optical fibers with light inlet ends occupying points of the virtual image which represent the image of a concentric circle within the scan zone of the plane of the material being sewn and including outlet ends which are optically coupled in individual assignment with elements of the sensor line.

2. A sensor device according to claim 1, wherein said objective of said optical imaging means includes a plurality of gradient lenses, said gradient lenses being arranged circularly around a guide of said needle to jointly generate a virtual image of said annular scanned zone of the plane of the material being sewn in said imaging plane.

3. A sensor device according to claim 2, wherein said optical fibers are greater in number than a number of said gradient lenses.

4. A sensor device according to claim 2, wherein said gradient lenses are dimensioned such that each of said gradient lenses images an area in the scanned zone as an upright image in the imaging plane.

5. A sensor device according to claim 2, wherein said gradient lenses include optical axes extending essentially in parallel to an axis of said needle and extending perpendicularly to the plane of the material being sewn for projecting the image of the concentric circle into said imaging plane, said imaging plane being located above the presser foot in parallel to the plane of the material being sewn.

6. A sensor device according to claim 5, wherein said gradient lenses are dimensioned such that said imaging plane is located on the end faces of the gradient lenses.

7. A sensor device according to claim 5, wherein said gradient lenses are dimensioned so that the imaging plane is located at a spaced location from the gradient lenses.

8. A sensor device according to claim 5, wherein said plurality of gradient lenses form a single-row ring with individual gradient lenses arranged directly adjacent one another, optical fibers in said imaging plane occupying points of a circle, which circle extends through the optical axes of the gradient lenses.

9. A sensor device according to claim 5, wherein said plurality of gradient lenses are subdivided between two concentric rings, one ring by lying inside the other and said rings being in contact with one another, wherein the optical axes of the gradient lenses of the outer ring are in angular positions located between the angular positions of the optical axes of the gradient lenses of the inner ring; said gradient lenses being dimensioned such that each gradient lens images an area in the scanned zone of the plane of the material being sewn as an upright image on a scale of 1:1 in the common imaging plane; said light inlet ends of said image-transmitting optical fibers in the imaging plane occupy points of a circle that is equidistant from the optical axis of the inner ring of the gradient lenses and from the optical axes of the outer ring of the gradient lenses.

10. A sensor device according to claim 1, wherein said objective of said optical imaging means comprises spherical lens means including one of a single spherical lens and plural spherical lenses arranged one behind the other, said spherical lens means having optical axes concentric with a circle occupied by said light outlet ends of said image-transmitting optical fiber and including a central bore that is concentric with said optical axes, said central bore providing passage of said presser foot.

11. A sensor device according to claim 10, wherein said spherical lens means includes two spherical lenses arranged one behind the other to generate an upright image of the plane of the material being sewn in the imaging plane.

12. A sensor device according to claim 1, further comprising illuminating means for illuminating the plane of the material being sewn obliquely from the top at an incidence angle such that light is reflected in the plane of the material being sewn and bypasses the effective aperture of the imaging system according to the reflection law.

13. A sensor device according to claim 12, wherein said illuminating means is a tubular lamp arranged above the plane of the material being sewn concentrically to the scanned zone, said imaging means having a diameter which is larger than said scanned zone.

14. A sensor device according to claim 12, wherein said illuminating means comprises a plurality of light sources arranged above the plane of the material being sewn in a circle that is concentric with the scanned zone and said illuminating means has a diameter that is larger than a diameter of said scanned zone and overlappingly illuminates adjacent areas of said scanned zone.

15. A sensor device according to claim 14, wherein each of said light sources is formed by an outlet end of light source transmitting optical fiber means formed of one of an optical fiber or a bundle of optical fibers, said light source transmitting optical fiber means including inlet ends receiving light energy from a common illuminating source.

16. A sensor device according to claim 15, wherein said light source transmitting optical fiber means includes a Fresnel lens for increasing the actual light emission angle arranged on outlet ends of each light guide.

17. A sensor device according to claim 5, wherein the objected of the imaging system and the inlet side end sections of the image-transmitting optical fibers are held in a tube that can be pushed from below over said presser foot to the arm of the sewing machine and including a device for detachably fastening said tube on the machine arm.

18. A sensor device according to claim 17, wherein said fastening device comprises engaging parts of a bayonet connection.

19. A sensor device according to claim 12, wherein the objective of the imaging system and the inlet side end sections of the image-transmitting optical fibers are held in a tube that can be pushed from below over said presser foot to the arm of the sewing machine and including a device for detachably fastening said tube on the machine arm a holder for supporting said illuminating means, said holder being fastened to a lower end of said tube.

20. A sensor device according to claim 17, wherein a hinge is provided and connected between said machine arm and said machine frame for permitting the machine arm to be pivot up to removably mount said tube.

* * * * *